US011781383B2

(12) United States Patent
Netecke

(10) Patent No.: US 11,781,383 B2
(45) Date of Patent: Oct. 10, 2023

(54) LINEAR MOTOR HOISTING SYSTEM

(71) Applicant: Cameron International Corporation, Houston, TX (US)

(72) Inventor: Michael Raymond Netecke, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 415 days.

(21) Appl. No.: 16/939,882

(22) Filed: Jul. 27, 2020

(65) Prior Publication Data

US 2022/0025717 A1     Jan. 27, 2022

(51) Int. Cl.
| | |
|---|---|
| *E21B 19/00* | (2006.01) |
| *B66D 1/36* | (2006.01) |
| *E21B 19/02* | (2006.01) |
| *H02K 1/12* | (2006.01) |
| *H02K 41/03* | (2006.01) |

(52) U.S. Cl.
CPC .............. *E21B 19/008* (2013.01); *B66D 1/36* (2013.01); *E21B 19/02* (2013.01); *H02K 41/031* (2013.01); *H02K 1/12* (2013.01)

(58) Field of Classification Search
CPC ............................. H02K 5/1285; F04B 17/03
See application file for complete search history.

(56) References Cited

U.S. PATENT DOCUMENTS

| | | | |
|---|---|---|---|
| 7,969,044 B2 | 6/2011 | Armstrong et al. | |
| 8,541,909 B2 | 9/2013 | Armstrong et al. | |
| 2011/0280104 A1* | 11/2011 | McClung, III | ............ E21B 3/02 175/170 |
| 2013/0026859 A1* | 1/2013 | Bae | ......... H02K 41/03 |
| 2018/0262146 A1* | 9/2018 | Raassina | ................... B66B 1/30 |
| 2019/0028015 A1 | 1/2019 | Barrett et al. | |

FOREIGN PATENT DOCUMENTS

| | | | | |
|---|---|---|---|---|
| CN | 202483475 U | * | 10/2012 | |
| DE | 102014101276 A1 | * | 8/2015 | ............. H02K 41/03 |
| WO | WO-2012016045 A1 | * | 2/2012 | ............. E21B 21/08 |
| WO | WO-2017061875 A2 | * | 4/2017 | ............... B66D 1/36 |
| WO | 2019213041 A1 | | 11/2019 | |

OTHER PUBLICATIONS

CN-202483475-U_translation.*
DE-102014101276-A1_translation.*

* cited by examiner

*Primary Examiner* — Tulsidas C Patel
*Assistant Examiner* — Mohammed Ahmed Qureshi
(74) *Attorney, Agent, or Firm* — Jeffrey D. Frantz

(57) ABSTRACT

Systems and methods for hoisting a top drive of a drilling rig. An example system includes a hoisting system having a linear electric motor operable to raise and lower the top drive. An example method includes commencing operation of a processing device to cause operation of the linear electric motor to raise and lower the top drive. The linear electric motor may have a stator connected to and extending vertically along a mast of the drilling rig, and a rotor connected to the top drive and operable to move relative to the stator. The rotor may be connected to the top drive via one or more flexible lines.

20 Claims, 5 Drawing Sheets

LINEAR MOTOR HOISTING SYSTEM

BACKGROUND OF THE DISCLOSURE

Wells are generally drilled into the ground or ocean bed to recover natural deposits of oil, gas, and other materials that are trapped in subterranean formations. Well construction operations (e.g., drilling operations) are performed at a wellsite by a drilling system (e.g., a drilling rig) having various automated surface and subterranean equipment operating in a coordinated manner. For example, a top drive located at a wellsite surface can be utilized to rotate and advance a drill string into a subterranean formation to drill a wellbore. The drill string includes a plurality of drill pipes coupled together and terminating with a drill bit. Length of the drill string can be increased by adding additional drill pipes while depth of the wellbore increases. Drilling fluid is pumped from the wellsite surface down through the drill string to the drill bit. The drilling fluid lubricates and cools the drill bit, and carries drill cuttings from the wellbore back to the wellsite surface. The drilling fluid returning to the surface is cleaned and again pumped through the drill string.

The top drive is suspended from a mast via a hoisting system comprising a traveling block, a crown block, and a drawworks storing a flexible line. The crown block is connected to the mast and the traveling block is connected to the top drive. The crown block and traveling block each comprise one or more pulleys or sheaves around which the flexible line is reeved to operatively connect the crown block, the traveling block, and the drawworks. The drawworks selectively imparts tension to the flexible line to lift and lower the top drive, resulting in the vertical movement of the top drive and the drill string connected with the top drive. The drawworks comprises a drum, a base, and a prime mover operable to rotate the drum to reel in the flexible line, causing the traveling block and the top drive to move upward. The prime mover is further operable to rotate the drum to reel out the flexible line, causing the traveling block and the top drive to move downward.

A hoisting system comprising a drawworks causes excessive wear of the flexible line, thereby decreasing operational life of the flexible line. For example, multi-layer spooling of the flexible line around the drum causes cuts and abrasions to be imparted to the flexible line when multiple layers of the flexible line are forced against each other and slip when the flexible line is reeled in and out by the drum. Furthermore, each sheave causes an increase in tension, and thus stress, on one side of the flexible line each time the flexible line is reeved around the sheave.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a hoisting system for a drilling rig. The hoisting system includes a linear electric motor operable to raise and lower a top drive. The linear electric motor may include a stator and a rotor. The stator may be connected to and extend vertically along a mast of the drilling rig. The rotor may be operable to move relative to the stator. The rotor and the top drive may be connected. The stator may be a first stator, the linear electric motor may include a second stator, and the rotor may be disposed between the first and second stators.

The present disclosure also introduces a method including commencing operation of a processing device to thereby cause operation of a linear electric motor to raise and lower a top drive of a drilling rig.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
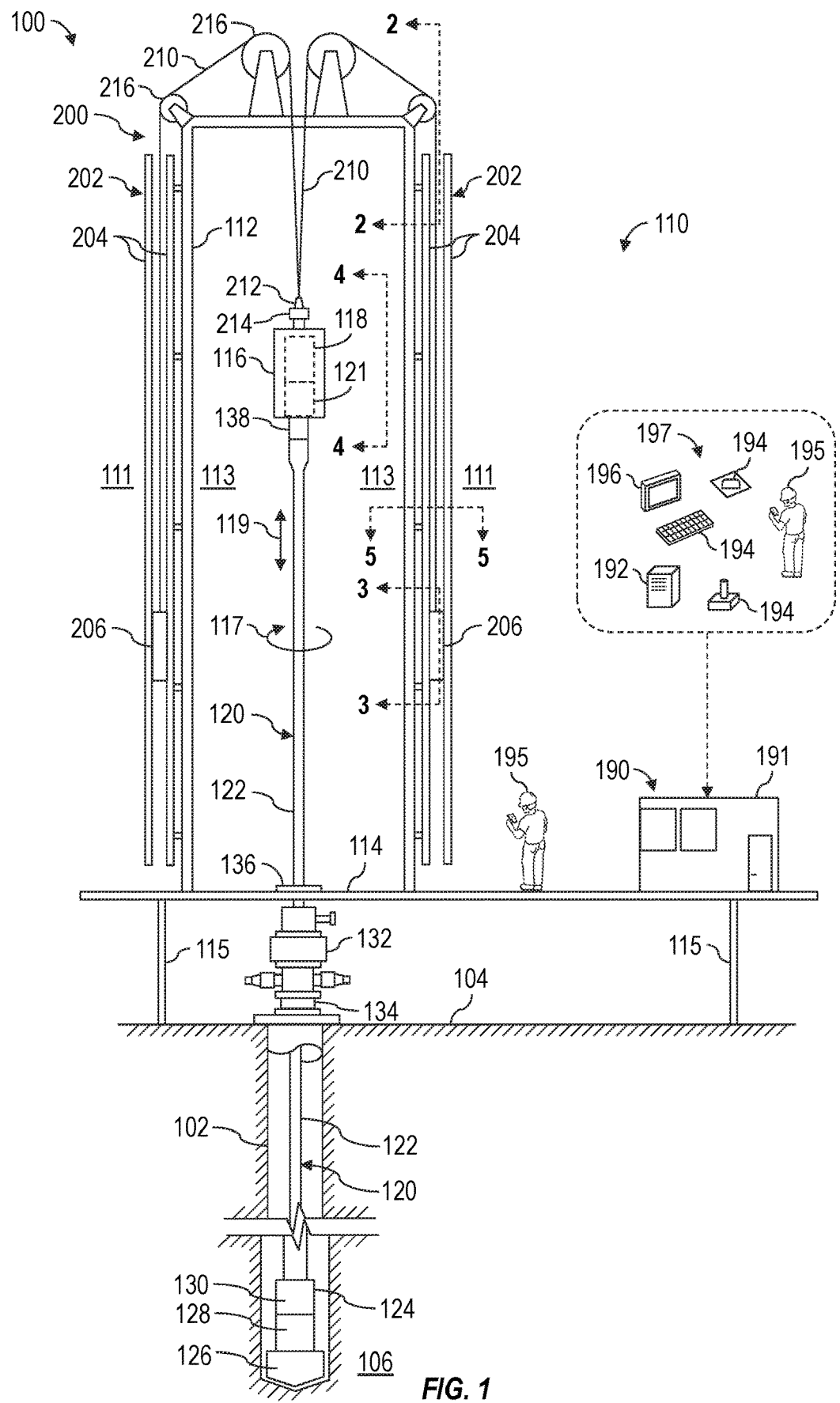
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods (e.g., processes and/or operations) according to one or more aspects of the present disclosure may be used or performed in association with a well construction system at a wellsite, such as for constructing a wellbore to obtain hydrocarbons (e.g., oil and/or gas) or other natural resources from a subterranean formation. A person having ordinary skill in the art will readily understand that one or more aspects of systems and methods disclosed herein may also be applicable to, adapted for, or otherwise utilized in other industries and/or in association with other systems.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction (e.g., drilling) rig operable to construct (e.g., drill) a wellbore 102 extending from a wellsite surface 104 into a subterranean formation 106 via rotary and/or directional drilling. Although the well construction system 100 is depicted as an onshore implementation, the aspects described below are also applicable to offshore implementations.

The well construction system 100 comprises well construction equipment, such as surface equipment 110 located at the wellsite surface 104 and a drill string 120 suspended within the wellbore 102. The surface equipment 110 may include a support structure 112 (e.g., a mast or derrick) disposed over a rig floor 114. The drill string 120 may be suspended within the wellbore 102 from the support structure 112. The support structure 112 and the rig floor 114 are collectively supported over the wellbore 102 by legs and/or other support structures 115. Certain pieces of surface equipment 110 may be manually operated (e.g., by hand and/or via a local control panel) by rig personnel 195 (e.g., a roughneck or another human rig operator) located at various portions (e.g., the rig floor 114) of the well construction system 100.

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, and/or other means for conveying the BHA 124 within the wellbore 102. A downhole end of the BHA 124 may include or be coupled to a drill bit 126. Rotation of the drill bit 126 and the weight of the drill string 120 may collectively operate to form the wellbore 102. The drill string 120, including the drill bit 126, may be rotated 117 by a top drive 116 connected (perhaps indirectly) with the drill string 120. The top drive 116 may comprise a drive shaft 138 operatively connected with a prime mover (e.g., an electric motor) 118 of the top drive 116, such as via a gear box or transmission 121. The drive shaft 138 may be selectively coupled with the upper end of the drill string 120 and the prime mover 118 may be selectively operated to rotate the drive shaft 138 (e.g., via the transmission 121) and the drill string 120 coupled with the drive shaft 138. A downhole mud motor 128 connected with the drill bit 126 may also or instead impart the rotational motion 117 to the drill bit 126. The BHA 124 may also include one or more downhole tools 130 above and/or below the mud motor 128.

The top drive 116 may be suspended from (supported by) the support structure 112 via a hoisting system 200 operable to impart vertical motion 119 to the top drive 116 and the drill string 120 connected to the top drive 116. During drilling operations, the top drive 116, in conjunction with operation of the hoisting system 200, may advance the drill string 120 into the formation 106 to form the wellbore 102.

A set of slips 136 may be located on the rig floor 114, such as may accommodate the drill string 120 during drill string make up and break out operations, drill string running operations, and drilling operations. The slips 136 may be in an open position during running and drilling operations to permit advancement of the drill string 120 within the wellbore 102 by the hoisting system 200, and in a closed position to clamp the upper end (e.g., uppermost tubular) of the drill string 120 to thereby suspend and prevent advancement of the drill string 120 within the wellbore 102, such as during the make up and break out operations. The hoisting system 200 may deploy the drill string 120 into the wellbore 102 through fluid control equipment 132 for maintaining well pressure control and for controlling fluid being discharged from the wellbore 102. The fluid control equipment 130 may be mounted on top of a wellhead 134 installed over the wellbore 102.

The hoisting system 200 comprises one or more linear electric motors 202, each selectively operable to raise and lower the top drive 116. Each linear electric motor 202 comprises a stator 204 connected to and extending vertically along the support structure 112 (e.g., a mast) and a rotor 206 operable to move relative to the stator 204. The rotor 206 may be mechanically or otherwise operatively connected with the top drive 116, such that movement of the rotor 206 relative to the stator 204 causes vertical movement 119 of the top drive 116. The stator 204 may be operable to generate changing magnetic fields to move the rotor 206 upward and downward relative to the stator 204 and the support structure 112, and thereby operable to raise and lower the top drive 116 above the wellbore 102. The stator 204 may comprise a plurality of electromagnetic coils (not shown) each operable to generate a changing magnetic field. The rotor 206 may comprise a plurality of permanent magnets or induction coils responsive to the magnetic fields, thereby causing the rotor 206 to move relative to the stator 204.

Each linear electric motor 202 may comprise a single stator 204 located adjacent the rotor 206 or two stators 204 located adjacent the rotor 206, each on an opposing side of the rotor 206 such that the rotor 206 is located between the stators 204. The stators 204 may be connected to or otherwise supported by the support structure 112 via a plurality of beams, brackets, and/or other connecting members extending between each stator 204 and the support structure 112.

The rotors 206 and the top drive 116 may be connected via one or more flexible lines 210 (e.g., cables, wire ropes, belts, etc.) extending between the rotors 206 and the top drive 116. The flexible lines 210 are operable to transfer upward and downward force generated by the linear electric motors 202 to the top drive 116 to facilitate upward and downward movement of the top drive 116. A first end of each flexible line 210 may be fixedly connected to a corresponding rotor 206 and a second end of each flexible line 210 may be fixedly connected to the top drive 116. Each end of each flexible line 210 may comprise or be connected with a line end termination device 212 configured to facilitate connection with a corresponding one of the rotor 206 and the top drive 116. The first line end termination device 212 of each flexible line 210 may be connected with a corresponding rotor 206 and the second line end termination device 212 may be directly connected with the top drive 116 or indirectly via a bracket or another intermediate member 214. Each line end termination device 212 may be or comprise, for example, an open spelter socket, a closed spelter socket, a wire rope socket, a thimble, or a swage fitting.

The hoisting system 200 may further comprise a plurality of sheaves 216 connected to or otherwise supported by the support structure 112. The sheaves 216 may be connected at an upper end or portion of the support structure 112. The flexible lines 210 may be reeved around corresponding sheaves 216, which may guide and change direction of the flexible lines 210 extending between the rotors 206 and the top drive 116 and thus change direction of force generated by the linear electric motor 202 and transmitted by the flexible lines 210 to facilitate upward and downward movement of the top drive 116.

When just one linear electric motor 202 is utilized as part of the hoisting system 200, the single linear electric motor 202 may be independently operable to raise and lower the top drive 116. When a plurality of linear electric motors 202 are utilized as part of the hoisting system 200, the plurality of linear electric motors 202 may be collectively operable to raise and lower the top drive 116. When a plurality of linear electric motors 202 are utilized as part of the hoisting system 200, each linear electric motor 202 may be located on a different side of the support structure 112. When two linear electric motors 202 are utilized, each linear electric motor 202 may be located on an opposing side of the top drive 116. For example, each linear electric motor 202 may be disposed externally from or on an outer side 111 of the support structure 112, or each linear electric motor 202 may instead be disposed within or on an inner side 113 of the support structure 112 between the top drive 116 and the support structure 112. When three linear electric motors 202 are utilized, first and second ones of the linear electric motors 202 may be located on an opposing inner 113 or outer 111 side of the support structure 112, and the third linear electric motor 202 may be located on an outer back side 115 (shown in FIGS. 4 and 5) of the support structure 112 that extends between the opposing sides 111, 113 of the support structure 112. When four linear electric motors 202 are utilized, first and second ones of the linear electric motors 202 may be located on an opposing outer side 111 of the support structure 112, while the third and fourth linear electric motors 202 may be located on an opposing inner side 113 of the support structure 112. If a fifth linear electric motor 202 is utilized, the fifth linear electric motor 202 may be located on the outer back side 115 of the support structure 112.

The surface equipment 110 of the well construction system 100 may also comprise a control center 190 from which various portions of the well construction system 100, such as the top drive 116, the hoisting system 200, a tubular handling system (e.g., a catwalk, a tubular handling device, etc.), a drilling fluid circulation system (e.g., mud pumps), a drilling fluid cleaning and reconditioning system, a well control system (e.g., the fluid control valves 132, a choke manifold, etc.), and the BHA 124, among other examples, may be monitored and controlled. The control center 190 may be located on the rig floor 114 or another location of the well construction system 100, such as the wellsite surface 104.

The control center 190 may comprise a facility 191 (e.g., a room, a cabin, a trailer, etc.) containing a control workstation 197, which may be operated by rig personnel 195 (e.g., a driller or another human rig operator) to monitor and control various wellsite equipment or portions of the well construction system 100. The control workstation 197 may comprise or be communicatively connected with a control device 192 (e.g., a processing device, an equipment controller, etc.), such as may be operable to receive, process, and output information to monitor operations of and/or provide control to one or more portions of the well construction system 100. For example, the control device 192 may be communicatively connected with the various surface equipment 110 and/or downhole equipment 124 described herein, among other examples, and may be operable to receive signals (e.g., sensor measurements and/or other data) from and transmit signals (e.g., control commands, signals, and/or other data) to the equipment to perform various operations, perhaps including at least a portion of one or more of the operations described herein. The control device 192 may store executable program code, instructions, and/or operational parameters or setpoints, including for implementing one or more aspects of the methods and operations described herein. The control device 192 may be located within and/or outside of the facility 191.

The control workstation 197 may be operable for entering or otherwise communicating control commands to the control device 192 by the rig personnel 195, and for displaying or otherwise communicating information from the control device 192 to the rig personnel 195. The control workstation 197 may comprise one or more input devices 194 (e.g., a keyboard, a mouse, a joystick, a touchscreen, etc.) and one or more output devices 196 (e.g., a video monitor, a touchscreen, a printer, audio speakers, etc.). Communication between the control device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Other implementations of the well construction system 100 within the scope of the present disclosure may include more or fewer components than as described above and/or depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
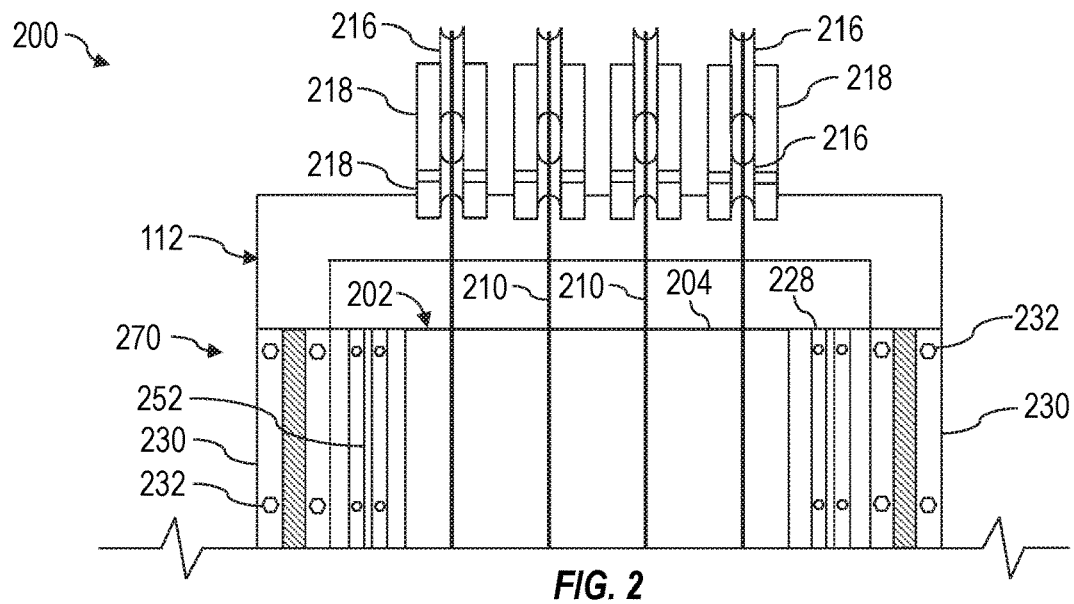
FIG. 2 is an enlarged view of at least a portion of an example implementation of the apparatus shown in FIG. 1.
Figure 3:
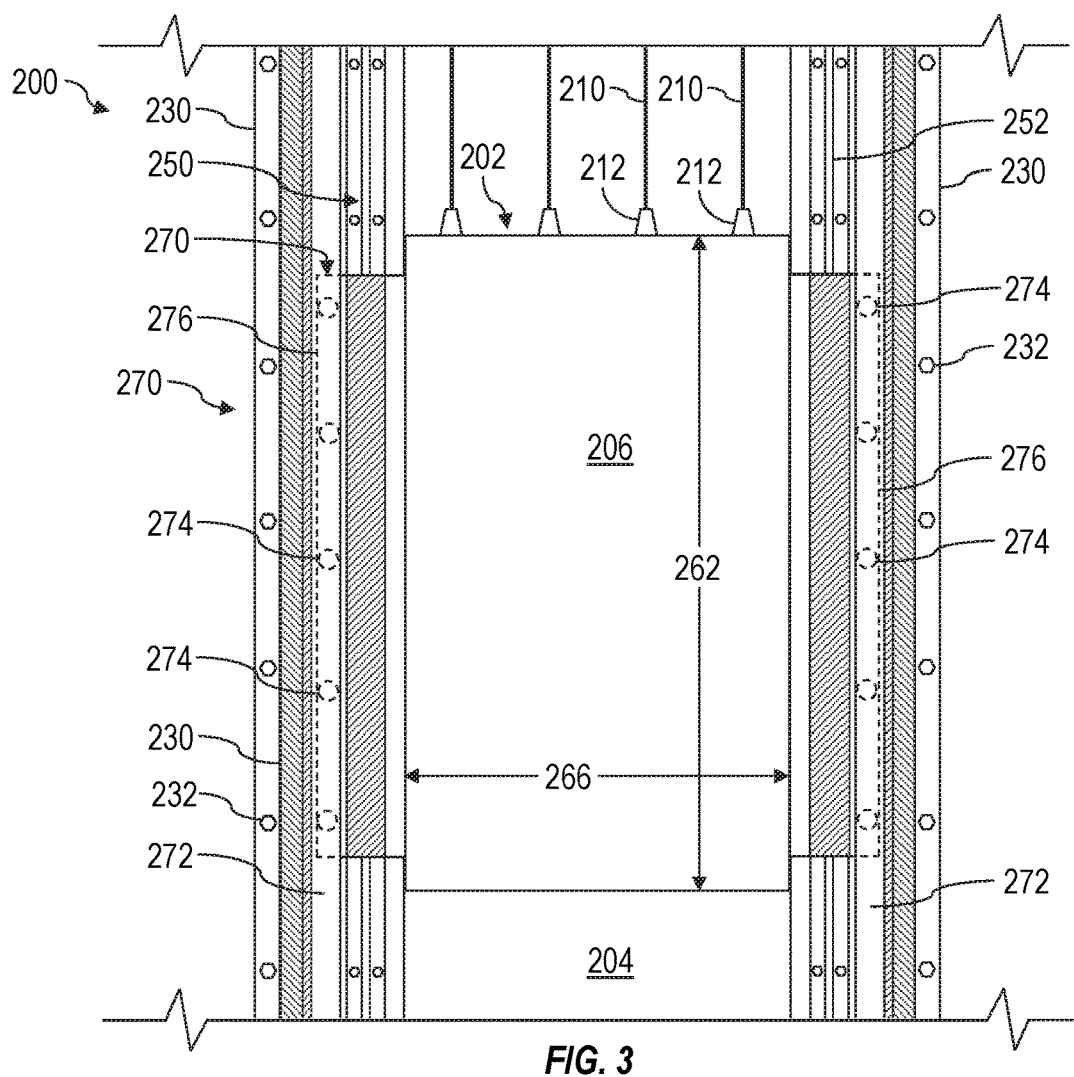
FIG. 3 is an enlarged view of at least a portion of an example implementation of the apparatus shown in FIG. 1.
Figure 4:
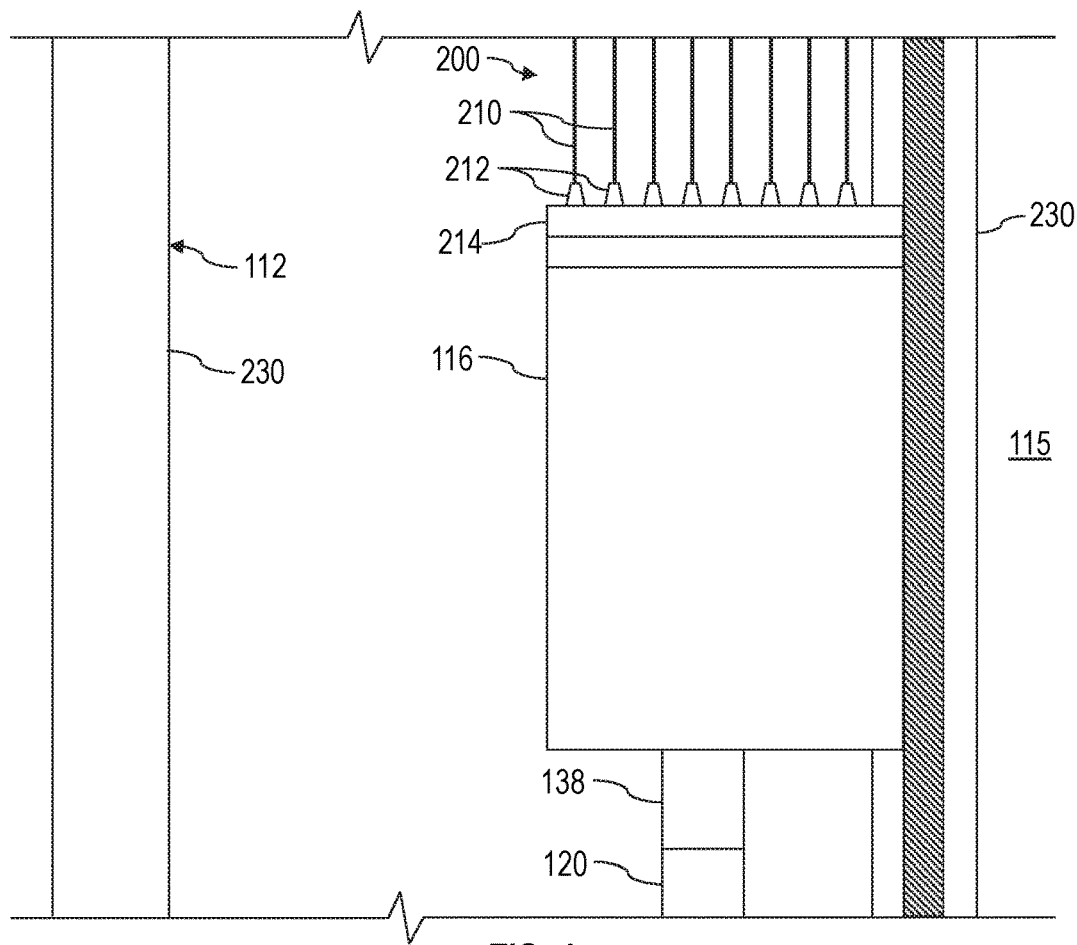
FIG. 4 is an enlarged view of at least a portion of an example implementation of the apparatus shown in FIG. 1.
Figure 5:
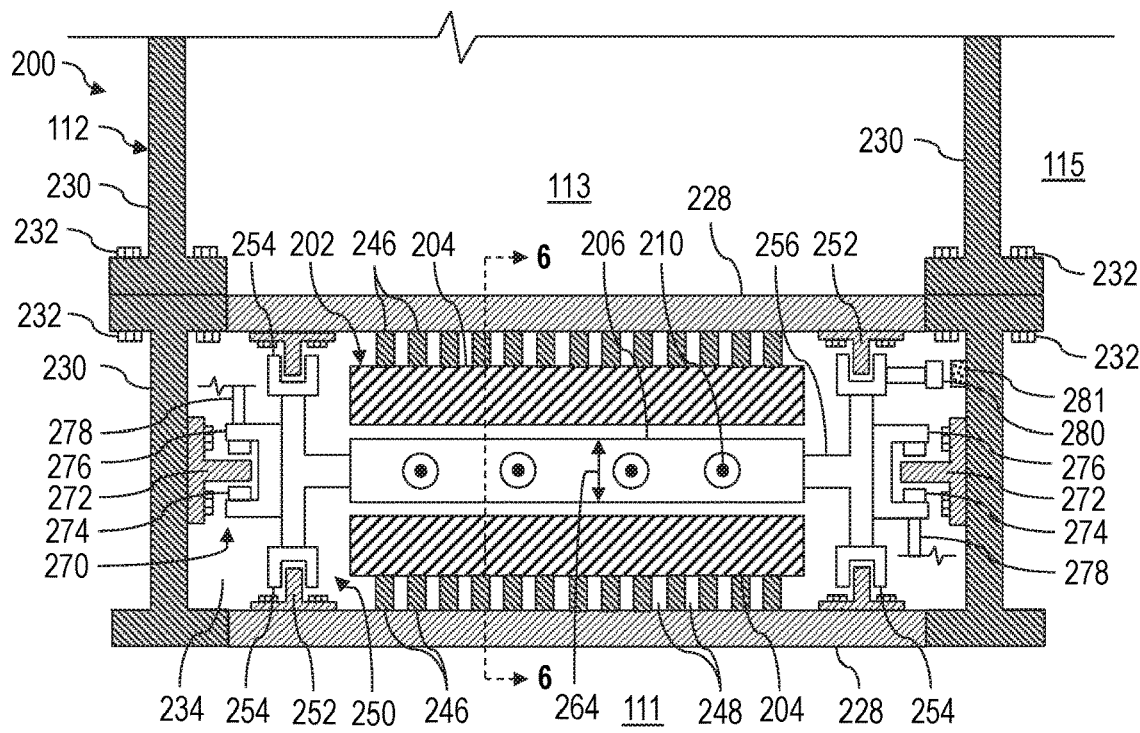
FIG. 5 is an enlarged view of at least a portion of an example implementation of the apparatus shown in FIG. 1.

FIGS. 2-5 are enlarged views of corresponding portions of the hoisting system 200 shown in FIG. 1. FIG. 2 is an enlarged side view of an upper end of the support structure 112 and a linear electric motor 202, including an upper end of the stator 204 and the sheaves 216 guiding the flexible lines 210 between the rotor 206 and the top drive 116. FIG. 3 is an enlarged side view of an intermediate portion of the linear electric motor 202, including the rotor 206 and an intermediate portion of the stator 204. FIG. 4 is an enlarged side view of a portion of the support structure 112 and the top drive 116 supported by the flexible lines 210. FIG. 5 is an enlarged sectional view of the linear electric motor 202. The following description refers to FIGS. 1-5, collectively.

Each sheave 216 may be fixedly connected or otherwise supported by the support structure 112 via corresponding brackets or other connecting members 218. The hoisting system 200 may comprise four sets of sheaves 216 associated with each linear electric motor 202. Each sheave 216 guides a corresponding flexible line 210 between the top drive 116 and the rotor 206 of a linear electric motor 202. Each flexible line 210 may be connected to the top drive 116 via a corresponding line end termination device 212. Each flexible line 210 may also be connected to a corresponding rotor 206 via a line end termination device 212. For example, four of the flexible lines 210 may be connected to the rotor 206 of the linear electric motor 202 disposed on one side of the support structure 112 and the other four flexible lines 210 may be connected to the rotor 206 of the linear electric motor 202 disposed on an opposing side of the support structure 112.

The rotor 206 of each linear electric motor 202 is disposed between the corresponding stators 204, which are at close proximity to or contact the rotor 206. The stators 204 may extend vertically along the support structure 112 substantially the entire height of the support structure 112 or a portion of the height of the support structure 112. For example, the stators 204 may extend vertically about 35 meters along a support structure having a height of about 40 meters. The rotor 206 may comprise a generally rectangular cuboid geometry having dimensions that facilitate forces sufficient to perform the drilling and other well construction operations. For example, the rotor 206 may comprise a height 262 of about 350 centimeters (cm), a width 264 of about 30 cm, and a length 266 ranging between about 90 cm and about 180 cm.

The support structure 112 may comprise a plurality of vertical structural members 230 (e.g., I-beams, C-beams, etc.) connected together to support various portions of the well construction system 100, including the top drive 116 and the hoisting system 200 for selectively lifting the top drive 116. The structural members 230 may be connected together via a plurality of fasteners 232.

Each stator 204 may be connected to or otherwise supported by the support structure 112 via corresponding structural members 228 extending between or otherwise connected with the structural members 230 of the support structure 112. Each structural member 228 may be or comprise a plurality of beams, plates, brackets, and/or other structural members extending between or otherwise connected with the structural members 230. Each structural member 228 may instead be or comprise a plate extending vertically along the length of each corresponding stator 204 and between two of the structural members 230. Each stator 204 may be connected to or otherwise supported by a structural member 228 via corresponding structural members 246 (e.g., back iron, beams, brackets, etc.) extending between the stator 204 and the structural member 228.

During hoisting operations, the stator 204 and/or other portions of each linear electric motor 202 may generate waste heat. Accordingly, the structural members 246 may be or comprise an array of cooling fins operable to conduct heat and thus facilitate faster removal of heat from the stators 204. The cooling fins may extend vertically and between the corresponding structural member 228 and stator 204. The cooling fins, the structural member 228, and the stator 204 may collectively define a plurality of passages 248 extending vertically along the length of each stator 204. A fluid (e.g., air, a liquid coolant, etc.) may be transferred through the passages 248 to facilitate faster removal of heat from the cooling fins and, thus, the stator 204. Furthermore, the structural members 228, 230 may collectively enclose or otherwise define a passage 234 (i.e., a space) extending vertically along the length of the stators 204. A gas (e.g., air) may be transferred through the passage 234 to facilitate faster removal of heat (i.e., forced convection) from the stators 204. The gas may be pumped or otherwise injected at one end of the passage 234 and conducted through the passage 234, including the passages 248 and/or spaces (e.g., gaps or slots) between the rotor 206 and the stators 204, and exhausted at the other end of the passage 234. For example, the gas may be injected at a lower end of the passage 234 adjacent a lower end of the support structure 112 and exhausted at an upper end of the passage 234 adjacent an upper end of the support structure 112.

Each linear electric motor 202 may further comprise a guide system 250 operable to guide vertical movement of the rotor 206 during hoisting operations. The guide system 250 may be or comprise a bearing system operable to permit the rotor 206 to move vertically with respect to the stators 204 while maintaining the rotor 206 at a predetermined horizontal position between the stators 204. The guide system 250 may comprise a plurality of guide members 252 (e.g., rails) extending vertically adjacent to the stators 204 and along the path of motion of the rotor 206. Each guide member 252 may be directly or indirectly connected to or otherwise supported by the support structure 112. For example, each guide member 252 may be connected to or otherwise supported by a corresponding structural member 228. Each guide member 252 may be connected to a corresponding structural member 228 via a plurality of fasteners. The guide system 250 may further comprise a plurality of guide members 254 (e.g., slide pads, linear bearings, etc.) connected to the rotor 206 via corresponding connecting members 256 (e.g., brackets, T-beams, etc.). Each guide member 254 may be configured to engage a corresponding guide member 252, such as to permit the guide member 254 to move vertically (e.g., slide), but not horizontally, along a corresponding guide member 252. The guide members 252, 254 may collectively permit the rotor 206 to move vertically with respect to (or along) the stators 204 and prevent or inhibit horizontal movement of the rotor 206 with respect to the stators 204, thereby maintaining the rotor 206 at a predetermined horizontal position between the stators 204.

The guide system 250 may comprise four sets of corresponding guide members 252, 254. Two guide members 252 may be connected with each structural member 228. Each connecting member 256 may extend laterally on each side of the rotor 206 and connect two guide members 254 to the rotor 206. Each connecting member 256 may be or comprise a T-beam extending at least a portion of the height 262 of the rotor 206. Each guide member 254 may be or comprise a U-shaped beam connected to and extending along an edge of a corresponding connecting member 256. The material forming at least a portion of one or both of the guide members 252, 254 may be or comprise a low-friction metal, a low-friction polymer, or other low-friction material configured to reduce friction between the guide members 252, 254 during hoisting operations.

Each linear electric motor 202 may further comprise a brake system 270 operable to stop or decelerate movement of the rotor 206 relative to the stator 204 and, thereby, stop or decelerate movement of the top drive 116. The brake system 270 may comprise one or more brake plates 272 extending vertically adjacent to the stators 204 and along the path of motion of the rotor 206. The brake system 270 may comprise a brake plate 272 on each opposing side of the rotor 206. Each brake plate 272 may be directly or indirectly connected to or otherwise supported by the support structure 112. For example, each brake plate 272 may extend vertically along a corresponding structural member 230. Each brake plate 272 may be connected to a corresponding structural member 230 via a plurality of fasteners.

The brake system 270 may further comprise a plurality of brake assemblies 274 connected to the rotor 206 on one or both sides of the rotor 206. Each brake assembly 274 may be operable to apply a braking force to a corresponding brake plate 272 to stop or decelerate movement of the rotor 206. Each brake assembly 274 may be or comprise a fluid-powered (e.g., hydraulic) piston or ram operable to apply the braking force to the brake plate 272. The brake system 270 may further comprise one or more calipers 276 configured to maintain or support the brake assemblies 274 in relative position with respect to the brake plate 272 and the rotor 206. Each caliper 276 may be or comprise a structural member (e.g., a C-beam) extending vertically along and adjacent to a corresponding brake plate 272 and the rotor 206. The brake system 270 may comprise at least one caliper 276 on each opposing side of the rotor 206. Each caliper 276, and thus brake assembly 274, may be connected to the rotor 206 via a corresponding connecting member 256. Each caliper 276 may support a plurality of brake assemblies 274 distributed vertically along the caliper 276. Accordingly, the brake system 270 may comprise a plurality of brake assemblies connected to the rotor 206 on each opposing side of the rotor 206. Each caliper 276 may support the brake assemblies 274 on opposing sides of a corresponding brake plate 272, such that the brake assemblies 274 can apply the braking force to opposing sides of each brake plate 272. During hoisting operations while the rotor 206 moves vertically with respect to the stators 204, the guide members 252, 254 may maintain the brake assemblies 274 at a predetermined position (e.g., distance) with respect to (e.g., about) the corresponding brake plates 272.

Pressurized fluid (e.g., air, hydraulic fluid, etc.) may be passed to each set of brake assemblies 274 on each side of the rotor 206 via corresponding fluid conductors 278. Each conductor 278 may be a flexible conductor (e.g., a hose) extending between a fluid source (not shown) and each set of brake assemblies 274. One end of each fluid conductor 278 may be supported by the support structure 112 and the other end of each fluid conductor 278 may be connected with a corresponding manifold configured to distribute the pressurized fluid to each brake assembly 274. Each fluid manifold may be incorporated into or otherwise comprise a corresponding caliper 276 having a plurality of internal fluid passages fluidly connecting the fluid conductor 278 to the brake assemblies 274 supported by the caliper 276.

Each brake assembly 274 may apply a braking force to a corresponding brake plate 272 in its normal (i.e., unactuated) state. For example, each piston of the brake assemblies 274 may be actuated by a spring (not shown) to apply a braking force to the brake plate 272 when pressurized fluid is not applied to the brake assemblies 274. Each piston of the brake assemblies 274 may be actuated by applying the pressurized fluid to the brake assemblies 274 to retract the pistons, thereby releasing the braking force of the brake assemblies 274 from the brake plate 272.

Each linear electric motor 202 may further comprise a linear position sensor 280 operable to generate or otherwise output a signal or information indicative of vertical position of the rotor 206. The sensor 280 may be directly or indirectly connected with the rotor 206 such that the sensor 280 moves vertically with the rotor 206. The sensor 280 may be or comprise a linear encoder disposed in association with a track 281 comprising distance indicators to be detected by the sensor 280. The track 281 may extend vertically along the support structure 112 along the path of motion of the rotor 206. The sensor 280 may instead be or comprise another linear position sensor, such as a light sensor or an ultrasound sensor.

Figure 6:
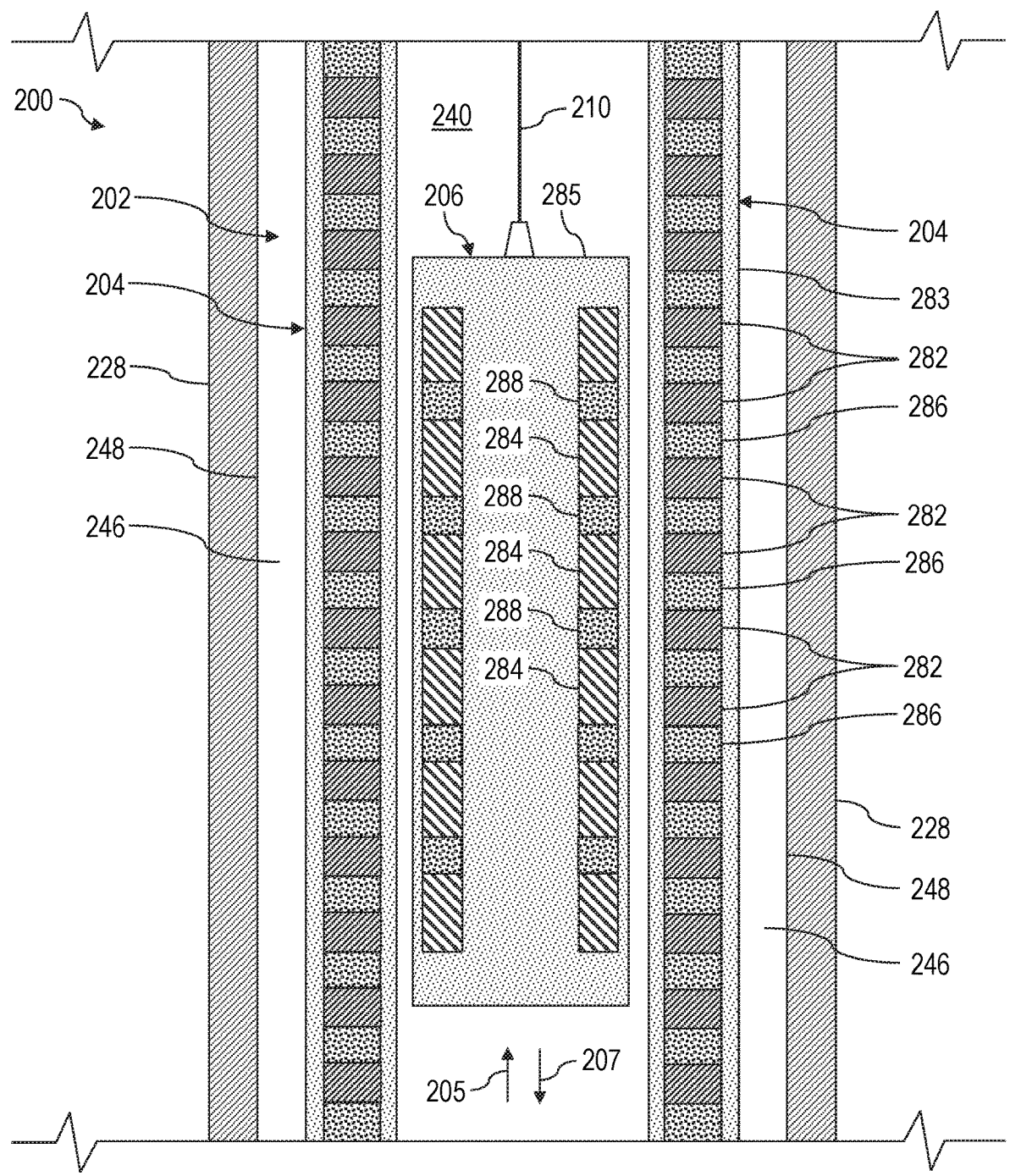
FIG. 6 is a sectional view of at least a portion of an example implementation of the apparatus shown in FIG. 5.

FIG. 6 is a sectional view of the linear electric motor 202 and the support structure 112 shown in FIG. 5. The stator 204 may be operable to receive electrical power for driving or otherwise imparting movement to the rotor 206 to selectively raise and lower the top drive 116. The linear electric motor 202 may comprise a single rotor 206 disposed between two stators 204. The stators 204 define a vertical space 240 (e.g., a gap or slot) extending therebetween and configured to accommodate the rotor 206 and permit the rotor 206 to move vertically along the stators 204. The rotor 206 may be located at a close proximity (e.g., between about one millimeter and about four millimeters) to each stator 204 or the rotor 206 may slidably engage (i.e., contact) each stator 204. The rotor 206 and/or the stators 204 may comprise or carry a plurality of rolling members (e.g., rollers, ball bearings, etc.) (not shown) extending between outer surfaces thereof. The rolling members may reduce friction between the rotor 206 and the stators 204 when the rotor 206 moves with respect to the stators 204.

Each stator 204 may comprise an array of magnets 282 maintained or supported in position by a structural member 283 (e.g., a housing, a body, a plate, etc.), which may comprise a non-magnetic material or a material causing little or no magnetic path resistance or magnetic distortion. The rotor 206 may comprise an array of magnets 284 maintained or supported in position by a structural member 285 (e.g., a housing, a body, a plate, etc.), which may comprise a non-magnetic material or a material causing little or no magnetic path resistance or magnetic distortion. The structural member 285 may be connected with the flexible lines 210, thereby connecting the rotor 206 to the top drive 116.

Each magnet 282 may be or comprise electromagnetic windings, such as wire wound into electromagnetic coils, which are connected to an electrical power source and operable to generate a magnetic field when powered by electrical current from the electrical power source. Non-magnetic and/or electrically insulating spacers 286 may interpose the magnets 282. Each magnet 284 may be or comprise permanent magnets or electromagnetic windings, such as wire wound into electromagnetic coils, which are connected to an electrical power source and operable to generate a magnetic field when powered by electrical current from the electrical power source. The magnets 284 may also or instead comprise magnetic induction members, such as iron, a magnetic form of stainless steel, and/or another material comprising strong magnetic properties and thus responsive to an electromagnetic driving force generated by the magnets 282. Non-magnetic and/or electrically insulating spacers 288 may interpose the magnets 284.

When electrically activated, the magnets 282 of the stator 204 may cause movement of the rotor 206 by electromagnetic means. The magnets 282 may be operated in a polyphase manner (from magnet to magnet) to selectively drive linear motion of the rotor 206 in upward 205 and downward 207 directions along the space 240. For example, the magnets 282 may be electrically operated to form waves or sequences of alternating or otherwise changing electromagnetic field polarities moving along the length of the stator 204 in the upward 205 or downward 207 directions. Such waves of alternating electromagnetic field polarities may be out of phase with the polarities of the magnets 284 of the rotor 206, resulting in coordinated magnetic attraction and/or repulsion between such magnets 282, 284 causing movement of the rotor 206 along the stator 204 within the space 240. The speed of the rotor 206 may be controlled by adjusting the speed of the waves of the alternating electromagnetic field polarities generated along the stator 204. The changing electromagnetic field polarities generated by the magnets 282 may be decelerated, stopped, or reversed to, respectively, decelerate, stop, or reverse movement of the rotor 206 and, thus, the top drive 116. The maximum force at which the rotor 206 moves or resists movement may be controlled by adjusting the strength of the magnetic field generated by the stator 204, such as by adjusting electrical current transmitted through the coil windings of the magnets 282. During hoisting operations, the rotor 206 may have a range of motion or stroke length that is substantially equal to the length of the stator 204.

The stator 204 may be operable to impart movement to the rotor 206, and thus to the top drive 116, in a substantially precise manner. That is, the electrical power for operating the magnets 282 of the stator 204 may be supplied and controlled by a variable-frequency drive (VFD), which may facilitate a wide range of achievable forces and speeds of the rotor 206 and, thus, the top drive 116. The VFD may be or form a portion of the control device 192 shown in FIG. 1. Operation of the VFD may be automatically controlled by a processing device of the control device 192 and/or the VFD may be at least in part manually controlled by rig personnel via the control workstation 197.

Figure 7:
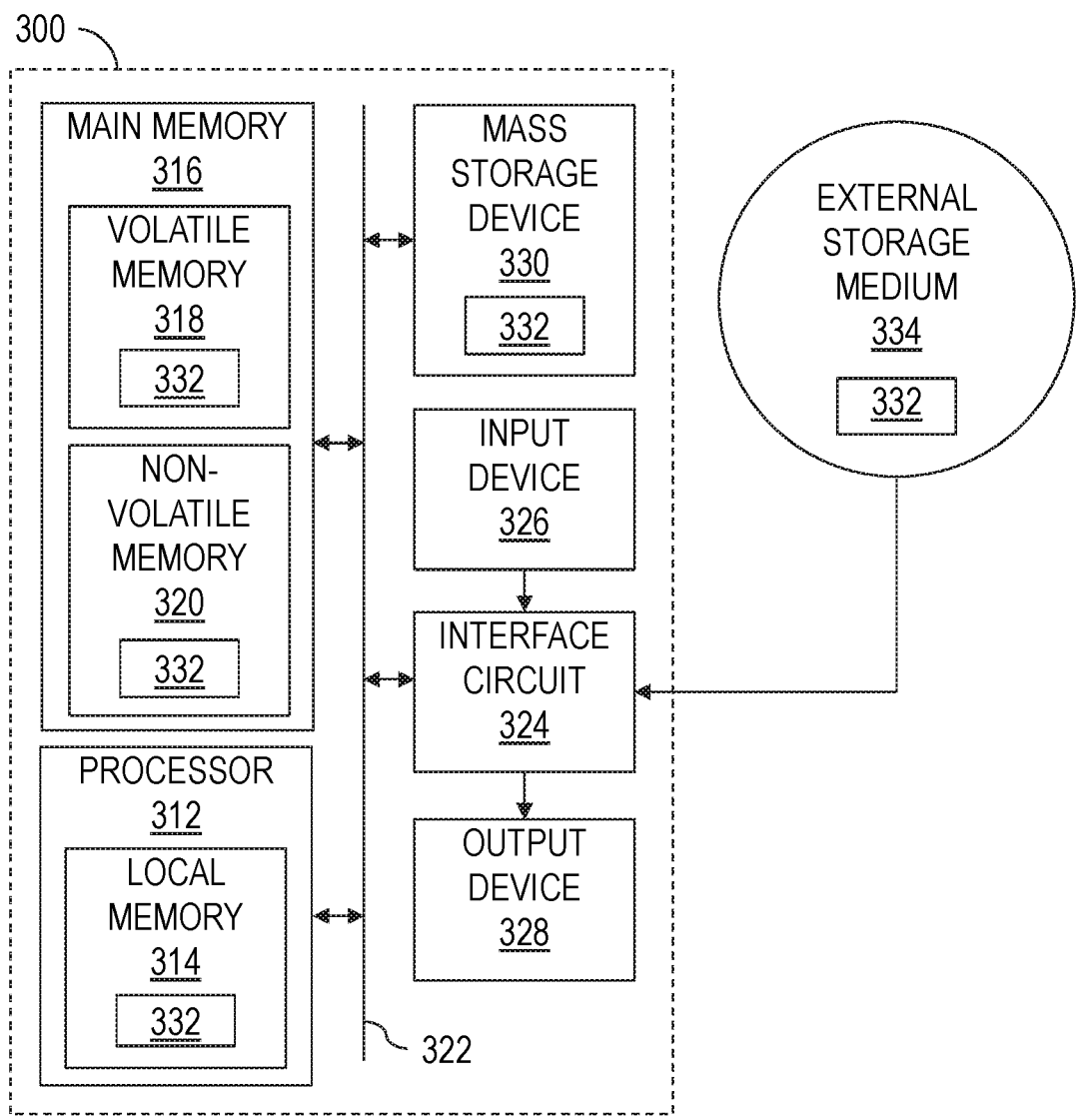
FIG. 7 is a schematic view of at least a portion of an example implementation of apparatus according to one or more aspects of the present disclosure.

FIG. 7 is a schematic view of at least a portion of an example implementation of a processing device 300 (or system) according to one or more aspects of the present disclosure. The processing device 300 may be or form at least a portion of one or more equipment controllers and/or other electronic devices shown in one or more of the FIGS. 1-6. Accordingly, the following description refers to FIGS. 1-7, collectively.

The processing device 300 may be or comprise, for example, one or more processors, controllers, special-purpose computing devices, PCs (e.g., desktop, laptop, and/or tablet computers), personal digital assistants, smartphones, industrial PCs (IPCs), programmable logic controllers (PLCs), servers, internet appliances, and/or other types of computing devices. The processing device 300 may be or form at least a portion of the control device 192 (e.g., a processing device, a VFD, etc.) and the control workstation 197. Although it is possible that the entirety of the processing device 300 is implemented within one device, it is also contemplated that one or more components or functions of the processing device 300 may be implemented across multiple devices, some or an entirety of which may be at the wellsite and/or remote from the wellsite.

The processing device 300 may comprise a processor 312, such as a general-purpose programmable processor. The processor 312 may comprise a local memory 314, and may execute machine-readable and executable program code instructions 332 (i.e., computer program code) present in the local memory 314 and/or another memory device. The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM and/or PICO families of microcontrollers, and/or embedded soft/hard processors in one or more FPGAs.

The processor 312 may execute, among other things, the program code instructions 332 and/or other instructions and/or programs to implement one or more aspects of the example methods and/or operations described herein. For example, the program code instructions 332, when executed by the processor 312 of the processing device 300, may cause the processor 312 to receive and process (e.g., compare) sensor data (e.g., sensor measurements). The program code instructions 332, when executed by the processor 312 of the processing device 300, may cause the processing device 300 to output control data (i.e., control commands) to cause one or more portions or pieces of well construction equipment of the well construction system 100, including the hoisting system 200, to perform the example methods and/or operations described herein. For example, the program code instructions 332, when executed by the processor 312 of the processing device 300, may cause electrical power to be output to one or more of the linear electric motors 202 to perform aspects of the example methods and/or operations described herein.

The processor 312 may be in communication with a main memory 316, such as may include a volatile memory 318 and a non-volatile memory 320, perhaps via a bus 322 and/or other communication means. The volatile memory 318 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing device 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 300 may be in communication with various sensors, video cameras, actuators, processing devices, equipment controllers, and other devices of the well construction system via the interface circuit 324. The interface circuit 324 can facilitate communications between the processing device 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit the rig personnel to enter the program code instructions 332, which may be or comprise control data, operational parameters, operational set-points, a well construction plan, and/or a database of operational sequences. The program code instructions 332 may further comprise modeling or predictive routines, equations, algorithms, processes, applications, and/or other programs operable to perform example methods and/or operations described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 326 and the one or more output devices 328 connected to the interface circuit 324 may, at least in part, facilitate the HMIs described herein.

The processing device 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing device 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 may be stored in the mass storage device 330, the main memory 316, the local memory 314, and/or the removable storage medium 334. Thus, the processing device 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may perform and/or cause performance of example methods, processes, and/or operations described herein.

The present disclosure is further directed to example methods (e.g., operations and/or processes) of performing drilling and other well construction operations with the top drive 116 and the hoisting system 200. The methods may be performed utilizing or otherwise in conjunction with implementations of one or more portions and/or instances of the apparatus shown in one or more of FIGS. 1-7 and/or otherwise within the scope of the present disclosure. The methods may be caused to be at least partially performed by a processing device, such as the processing device 300 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be at least partially performed, or caused to be at least partially performed, by a human wellsite operator utilizing implementations of one or more portions and/or instances of the apparatus shown in one or more of FIGS. 1-7 and/or otherwise within the scope of the present disclosure. Thus, the description herein of example methods may refer to apparatus shown in one or more of FIGS. 1-7. However, the methods may also be performed in conjunction with implementations of apparatus other than those depicted in FIGS. 1-7 that are also within the scope of the present disclosure.

In view of the entirety of the present disclosure, including the figures and the claims, a person having ordinary skill in the art will readily recognize that the present disclosure introduces an apparatus comprising a hoisting system for a drilling rig, wherein the hoisting system comprises a linear electric motor operable to raise and lower a top drive.

The linear electric motor may comprise: a stator connected to and extending vertically along a mast of the drilling rig; and a rotor operable to move relative to the stator, wherein the rotor and the top drive are connected. The stator may be a first stator, the linear electric motor may further comprise a second stator, and the rotor may be disposed between the first and second stators.

The stator may be operable to generate magnetic fields operable to move the rotor relative to the stator to raise and lower the top drive. The stator may comprise electromagnetic coils operable to generate the magnetic fields, and the rotor may comprise permanent magnets.

The rotor and the top drive may be connected via a plurality of flexible lines that each extend between the rotor and the top drive.

The rotor and the top drive may be connected via a flexible line. The hoisting system may further comprise a plurality of sheaves connected to the mast, and the flexible line may be reeved around the sheaves.

The hoisting system may further comprise: a brake plate; and a brake assembly operable to apply a braking force to the brake plate to stop movement of the rotor. The brake plate may be connected to and extend vertically along the mast, and the brake assembly may be connected to the rotor.

The linear electric motor may be a first linear electric motor, the hoisting system may further comprise a second linear electric motor, and the first and second linear electric motors may be cooperatively operable to raise and lower the top drive. The first linear electric motor may comprise: a first stator connected to and extending vertically along a first side of a mast of the drilling rig; and a first rotor operable to move relative to the first stator. The first rotor and the top drive may be connected. The second linear electric motor may comprise: a second stator connected to and extending vertically along a second side of the mast; and a second rotor operable to move relative to the second stator. The second rotor and the top drive may be connected. The hoisting system may further comprise a third linear electric motor. The first, second, and third linear electric motors may be cooperatively operable to raise and lower the top drive. The third linear electric motor may comprise: a third stator connected to and extending vertically along a third side of the mast; and a third rotor operable to move relative to the third stator. The third rotor and the top drive may be connected.

The present disclosure also introduces a method comprising commencing operation of a processing device to thereby cause operation of a linear electric motor to raise and lower a top drive of a drilling rig.

The linear electric motor may comprise a stator extending vertically along a mast of the drilling rig and a rotor connected to the top drive, and operation of the processing device may cause the rotor to move relative to the stator thereby raising and lowering the top drive. Operation of the processing device may cause the stator to generate changing magnetic fields that cause the rotor to move relative to the stator to raise and lower the top drive. Operation of the processing device may cause the stator to generate changing magnetic fields of an array of electromagnetic coils to cause the rotor to move relative to the stator to raise and lower the top drive.

Operation of the processing device may cause a variable frequency drive to output changing electrical power to each of a plurality of electromagnetic coils to generate changing magnetic fields thereby causing the rotor to move relative to the stator to raise and lower the top drive.

The rotor and the top drive may be connected via a flexible line extending between the rotor and the top drive, and operation of the processing device may cause the rotor to apply tension to the flexible line to raise the top drive.

Operation of the processing device may further cause a brake assembly to apply a braking force to stop movement of the rotor.

Operation of the processing device may further comprise: receiving first control data from an input device of a control workstation operated by rig personnel; and outputting second control data to cause operation of the linear electric motor to raise and lower the top drive.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a hoisting system for a drilling rig, wherein the hoisting system comprises a linear electric motor operable to raise and lower a top drive,
wherein the linear electric motor comprises:
a first stator connected to and extending vertically along a mast of the drilling rig;
a first rotor operable to move upward and downward relative to the first stator, wherein the first rotor and the top drive are connected; and
a second stator,
wherein the first rotor is disposed between the first and second stators of the linear electric motor,
wherein the linear electric motor is configured to obtain changing electrical power output from a variable frequency drive,
wherein the first rotor is operable to move vertically relative to the first stator in response to the changing electrical power, and
wherein the variable frequency drive is operable to control a vertical position of the first rotor.

2. The apparatus of claim 1 wherein the linear electric motor being operable to cause the first rotor to move vertically relative to the first stator comprises:
the first stator being operable to generate magnetic fields in response to the changing electrical power; and
the first rotor being operable to move relative to the first stator in response to the magnetic fields.

3. The apparatus of claim 2 wherein the first stator comprises electromagnetic coils operable to generate the magnetic fields, and wherein the first rotor comprises permanent magnets.

4. The apparatus of claim 1 wherein the first rotor and the top drive are connected via a plurality of flexible lines that each extend between the first rotor and the top drive.

5. The apparatus of claim 1 wherein the first rotor and the top drive are connected via a flexible line.

6. The apparatus of claim 5 wherein the hoisting system further comprises a plurality of sheaves connected to the mast, and wherein the flexible line is reeved around the sheaves.

7. The apparatus of claim 1 wherein the hoisting system further comprises:
a brake plate; and
a brake assembly operable to apply a braking force to the brake plate to stop movement of the first rotor.

8. The apparatus of claim 7 wherein the brake plate is connected to and extends vertically along the mast, and wherein the brake assembly is connected to the first rotor.

9. The apparatus of claim 1,
wherein the linear electric motor is a first linear electric motor,
wherein the hoisting system further comprises a second linear electric motor, wherein the first and second linear electric motors are cooperatively operable to raise and lower the top drive,
wherein the first stator of the first linear electric motor is connected to and extends vertically along a first side of the mast of the drilling rig,
wherein the second linear electric motor comprises:
a second stator connected to and extending vertically along a second side of the mast; and
a second rotor operable to move relative to the second stator of the second linear electric motor, wherein the second rotor of the second linear electric motor and the top drive are connected.

10. The apparatus of claim 9 wherein the hoisting system further comprises a third linear electric motor, wherein the first, second, and third linear electric motors are cooperatively operable to raise and lower the top drive, and wherein the third linear electric motor comprises:
a third stator connected to and extending vertically along a third side of the mast; and
a third rotor operable to move relative to the third stator, wherein the third rotor and the top drive are connected.

11. The apparatus of claim 1, wherein each stator is configured to be supported by a longitudinal structural member via a plurality structural members extending between the stator and the longitudinal structural member.

12. The apparatus of claim 1, wherein each stator is configured to be supported by a longitudinal structural member, and wherein each longitudinal structural member comprises a plate extending vertically along a length of each corresponding stator.

13. A method comprising:
commencing operation of a processing device to cause a variable frequency drive to output changing electrical power to thereby cause operation of a linear electric motor to raise and lower a top drive of a drilling rig,
wherein the linear electric motor comprises:
a first stator extending vertically along a mast of the drilling rig;
a rotor connected to the top drive; and
a second stator,
wherein the rotor is disposed between the first and second stators,
wherein the changing electrical power causes the rotor to move upward and downward relative to the first stator, thereby raising and lowering the top drive, and
wherein the variable frequency drive controls a vertical position of the rotor.

14. The method of claim 13 wherein the changing electrical power causes the first stator to generate changing magnetic fields that cause the rotor to move relative to the first stator.

15. The method of claim 13 wherein the changing electrical power causes the first stator to generate changing magnetic fields to cause the rotor to move relative to the first stator.

16. The method of claim 13 wherein operation of the processing device causes the variable frequency drive to output the changing electrical power to each of a plurality of electromagnetic coils to generate changing magnetic fields, and wherein the changing magnetic fields cause the rotor to move relative to the first stator.

17. The method of claim 13 wherein the rotor and the top drive are connected via a flexible line extending between the rotor and the top drive, wherein the changing electrical power causes the rotor to apply tension to the flexible line, and wherein the tension causes upward movement of the top drive.

18. The method of claim 13, further comprising causing, by the processing device, a brake assembly to apply a braking force to the rotor.

19. The method of claim 13 wherein operation of the processing device further comprises:
receiving first control data from an input device of a control workstation operated by rig personnel; and
outputting second control data to cause operation of the linear electric motor to raise and lower the top drive.

20. The method of claim 13, wherein each stator is configured to be supported by a longitudinal structural member, and wherein each longitudinal structural member comprises a plate extending vertically along a length of each corresponding stator.

* * * * *